Oct. 15, 1940.    A. W. RICHARDSON    2,217,876
VALVE FOR CONTROLLING AND INTERRUPTING THE FLOW OF FLUIDS
Filed March 24, 1939
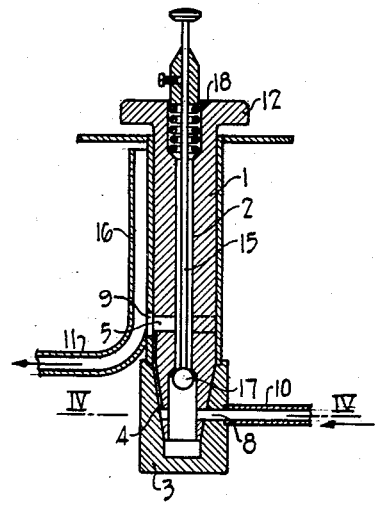
Fig. I.
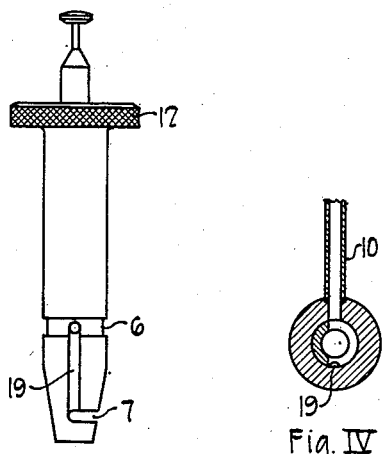
Fig. II
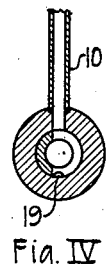
Fig. IV
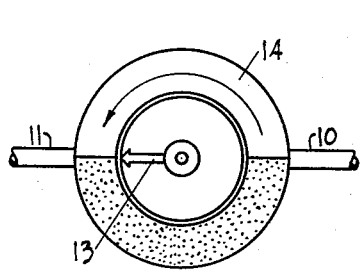
Fig III
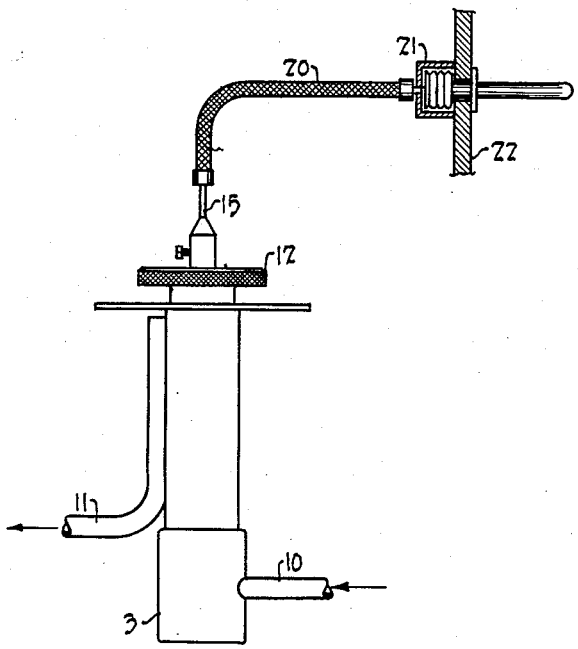
Fig. V
Inventor: Arthur Whittaker Richardson
By his Attorney: H. Birch Patented Oct. 15, 1940

2,217,876

UNITED STATES PATENT OFFICE 2,217,876

VALVE FOR CONTROLLING AND INTERRUPTING THE FLOW OF FLUIDS

Arthur Whittaker Richardson, London, England, assignor to Shell Development Company, San Francisco, Calif., a corporation of Delaware Application March 24, 1939, Serial No. 264,008
In Great Britain March 26, 1938

2 Claims. (Cl. 277—64)

The invention relates to a plug valve having a plug provided with one or more passages so arranged that during a substantial angular movement of the plug they communicate with corresponding passages in the housing, the mouth of at least one of the passages being extended circumferentially so as to form a groove which provides a restricted path for the flow of fluid when the corresponding passages are out of direct line, the length of said path varying according to the angular position of the plug, and consequently varying the rate of passage of the fluid through the valve.

The present invention consists in arranging at a suitable point in the plug or housing an auxiliary valve member by which the supply of fluid may be reduced to a predetermined rate of supply through a pilot or bypass.

Advantageously the auxiliary valve member is arranged to cut off completely one of the passages in the main valve, and the pilot or bypass may with advantage have the form of a passage cut on the outer surface of the plug of the main valve and opening into the passage of the main valve which is extended circumferentially and which provides the restricted path for the flow of fluid. In this form the advantage is obtained that the amount of fluid supplied by the bypass will be varied according to the angular position of the plug.

A preferred form of valve comprising an axially bored plug which is cylindrical over the greater part of its length, but conical at its lower end, is shown in the attached drawing, of which Figure 1 is a sectional elevation of the plug valve assembly.

Figure 2 is an elevation of the plug.

Figure 3 is a top view of said valve.

Figure 4 is a cross-sectional view along the lines IV—IV of Figure 1.

Figure 5 is an elevation of the valve including a thermostatic control element.

Referring to these figures a cylindrical plug 1 having an axial passage-way 2 throughout its length and a frustro-conical lower end is fitted into a corresponding housing 3 having a conical seating 4 at its bottom. On the cylindrical portion of the plug there is a cross passage 5 in the form of a bore leading to a circumferential groove 6 which extends over at least half the circumference and preferably entirely around the plug. A lower passage-way 7 is provided by cutting a notch in the conical part of the plug slightly more than half-way across. The conical seating 4 of the housing has a passage 8 for the inlet of fluid and the cylindrical part of the housing has an outlet 9 for the same. The passages 8 and 9 correspond with the lower and upper passages 7 and 5 respectively in the plug. Connected to the inlet and outlet passage-ways 8 and 9 of the housing are pipes 10 and 11 for conducting the fluid to and from the valve.

In the axial bore 2 of the plug an auxiliary valve member is fitted, comprising a rod 15 carrying a ball 17 at its lower end, the lower part of the axial bore of the plug being enlarged to receive this ball between the upper and lower cross passages, thus forming a ball seating inside the plug. The rod 15 is loaded by a spring 18, so as to urge the ball constantly towards its seating, and may be connected to the movable member of a thermostat control, e. g. the moving part of a bellows thermostat which tends, when the atmosphere surrounding the thermostat has reached a certain temperature, to urge the rod in the direction opposite to that of its spring bias, and thus to open the auxiliary valve.

On the outer surface of the plug member a groove 19 is cut, which is substantially vertical and connects the lower circumferential passage 7 on the plug body with the upper one 6, thus forming a bypass for the fluid when the auxiliary valve has closed the axial bore of the plug.

The upper portion of plug 1 has attached to it a knurled knob 12 for turning the plug in the desired position. An arrow 13 is provided on this knob to indicate the position of the plug in relation to the housing 3. A disc 14 with indications thereon is attached to the upper end of the housing 3.

It will readily be seen that with the valve assembled the lower part of the axial bore 2 of the plug will communicate through the lower cross passage 7 with the inlet passage 8 in the housing during slightly more than half a rotation of the plug. The upper part of the axial bore 2 will be in communication with the fluid outlet 9 through the circumferential groove passage 6 at the mouth of the upper cross passage 5 in the plug which provides the restricted path for the flow of fluid when the passages 5 and 9 are out of line.

Since the length of this path varies progressively according to the position of the plug, the rate of fluid flow through the axial bore of the plug, provided the auxiliary valve is in its opened position, will also vary progressively. The supply of fluid will finally be cut off when the plug is turned so far that the communication between the lower passage 7 on the plug and the lower passage 8 in the housing is interrupted. With the circumferential groove 6 extending entirely around the plug it will be appreciated that fluid may flow each way around the plug and that the resistance will be greatest when the lengths of the two paths approach most closely to equality, i. e. when the top cross passage 5 in the plug is diametrically opposite the corresponding passage 9 in the housing.

Owing to the fact that groove 19 leads into the upper passage 6, forming the restricted path the length of which varies according to the angular position of the plug, it will be appreciated that if the angular position is such that the main valve is set for a maximum rate of flow, more fluid will pass through the bypass if the auxiliary valve member is closed than will be the case if the main valve is so set as to reduce the flow of fluid through the main valve.

It will be understood that instead of making the groove 6 on the plug 1, a like groove may be made in the housing 3 in the same plane. Other minor variations will be apparent to those skilled in the art.

In use in a system containing liquid fuel the valve may with advantage be so arranged that the top of the housing is above the liquid level in the system, so that no packing gland or cover for the housing is necessary. The outlet pipe for the housing may then be provided with an air vent 16, which terminates just below the top of the housing. The axial bore 2 of the plug may likewise be open at the top, whereby a second air vent is provided. The likelihood of the formation of air locks is thereby minimized.

The valve described may suitably be used in conjunction with a kerosene burner for oil-heated ovens or refrigerators in which an element is heated by the oil burner, and the auxiliary valve in this case will be controlled by a thermostat, as shown in Figure 5, the sensitive element 21 of which is mounted in the refrigerator or oven chamber wall 22. A flexible cable 20 leads from thermostatic element 21 to rod 15 for actuation purposes. The burner may be of the usual short drum or creeping flame type, consisting of two or more perforated shells which rest or sit on an annular groove provided with an absorbent material, such as asbestos, and fed by a pipe leading to a reservoir, which in turn is provided with a Mariotte flask or other constant level device.

The temperature of the oven or refrigerator chamber will be maintained at a substantially constant value by the automatic operation of the auxiliary valve member, without disturbing the angular position of the plug of the main valve, which may be set to give the desired supply of fuel when the auxiliary valve is open.

What I claim is:

1. A plug valve adapted to control the gravitational flow of fluids comprising a plug, a housing member enclosing said plug, an axial passageway through the length of said plug, a seating area in said housing coacting with said plug, a lower passageway in said housing, a lower passageway in said plug arranged and adapted for communication with said lower housing passageway during at least 180° rotation of said plug and in direct communication with said axial passageway, an upper passageway in said housing, a circumferential groove around said plug in communication with said upper housing passageway, communication means between said circumferential groove and said axial passageway, auxiliary valve means including externally actuable operating means in said axial passageway between said lower plug passageway and said communication means, means normally urging said auxiliary valve to a closed position, thermostatically controlled actuating means arranged and adapted to actuate said externally actuable valve operating means, conduit means adapted to introduce fluid under gravitational flow to said lower housing passageway, conduit means adapted to receive fluid from said upper housing passageway, an atmospheric vent in said last named conduit means extending above the liquid level in said valve and a by-pass groove in the face of said plug extending from said lower plug passageway to said circumferential groove.

2. A plug valve adapted to control the gravitational flow of fluids comprising a plug, a housing member enclosing said plug, an axial passageway through the length of said plug, a seating area coacting with said plug, a lower passageway in said housing, a lower passageway in said plug arranged and adapted for communication with said lower housing passageway during at least 180° rotation of said plug and in direct communication with said axial passageway, an upper passageway in said housing, a circumferential groove around said plug in communication with said upper housing passageway, a by-pass groove in the face of said plug extending from said lower plug passageway to said circumferential groove, communication means between said circumferential groove and said axial passageway, auxiliary valve means in said axial passageway between said lower plug passageway and said communication means, conduit means adapted to introduce fluid to said lower housing passageway, conduit means adapted to receive fluid from said upper housing passageway and an atmospheric vent in said last named conduit means extending above the liquid level in said valve.

ARTHUR WHITTAKER RICHARDSON.